(12) United States Patent
Pivonka et al.

(10) Patent No.: US 6,216,638 B1
(45) Date of Patent: Apr. 17, 2001

(54) COLLAPSIBLE PET CARRIER

(76) Inventors: Scott Pivonka, 6547 S. Field Way, Littleton, CO (US) 80123; John Tottleben, 299 McDougal, Bailey, CO (US) 80421

(*) Notice: Subject to any disclaimer, the term of this patent is extended or adjusted under 35 U.S.C. 154(b) by 0 days.

(21) Appl. No.: 09/323,423

(22) Filed: Jun. 1, 1999

(51) Int. Cl.$^7$ ........................................................ A01K 1/03
(52) U.S. Cl. .............................. 119/498; 119/496; 119/499
(58) Field of Search .................................... 119/453, 461, 119/482, 491, 496, 498, 499

(56) References Cited

U.S. PATENT DOCUMENTS

| | | | |
|---|---|---|---|
| 3,195,506 | * 7/1965 | Beard | 119/496 |
| 3,324,831 | 6/1967 | St. Onge | 119/499 |
| 4,085,762 | 4/1978 | O'Brian et al. | 119/499 |
| 4,109,427 | 8/1978 | O'Brian et al. | 119/499 |
| 4,295,446 | 10/1981 | Voss | 119/499 |
| 4,484,540 | 11/1984 | Yamamoto | 119/498 |
| 4,603,658 | 8/1986 | Garnsey | 119/499 |
| 4,800,842 | 1/1989 | Jones, Jr. | 119/499 |
| 5,251,572 | * 10/1993 | Frame et al. | 119/496 |
| 5,493,818 | 2/1996 | Wilson | 52/71 |
| 5,549,073 | * 8/1996 | Askins et al. | 119/461 |
| 5,669,331 | 9/1997 | Richmond | 119/497 |
| 5,803,018 | * 9/1998 | Liou | 119/461 |
| 5,950,568 | * 9/1999 | Axelrod et al. | 119/499 |

* cited by examiner

Primary Examiner—Charles T. Jordan
Assistant Examiner—Elizabeth Shaw
(74) Attorney, Agent, or Firm—Ramon L. Pizarro; Edwin H. Crabtree

(57) ABSTRACT

A collapsible pet housing structure that includes a floor panel having a pair of parallel sides and a pair of ends extending between the sides. A pair of generally opposing walls are hingedly attached to the parallel sides of the floor panel, each wall including at least two generally planar wall panels hingedly connected to one another, each of the wall panels having an external surface and an internal surface, the internal surface of the wall panels of one wall facing the internal surface of the wall panels of the opposing wall, the hinged connection allowing movement of the wall panels from a first position where the external surfaces of the wall panels are at an acute angle relative to one another to a second position where the external surfaces of the wall panels are retained at an angle greater than 180 degrees relative to one another. The walls will preferably include supports for retaining the external surfaces of the wall panels at the second position relative to one another. The structure will also include a roof panel that extends between the walls and which is hingedly connected to the walls; and a pair of endwalls, each endwall being hingedly attached to the floor panel at opposing ends of the floor panel, the endwalls being adapted for supporting the wall panels in the second position, so that the roof panel is supported by the walls when the wall panels are at the second position.

17 Claims, 3 Drawing Sheets

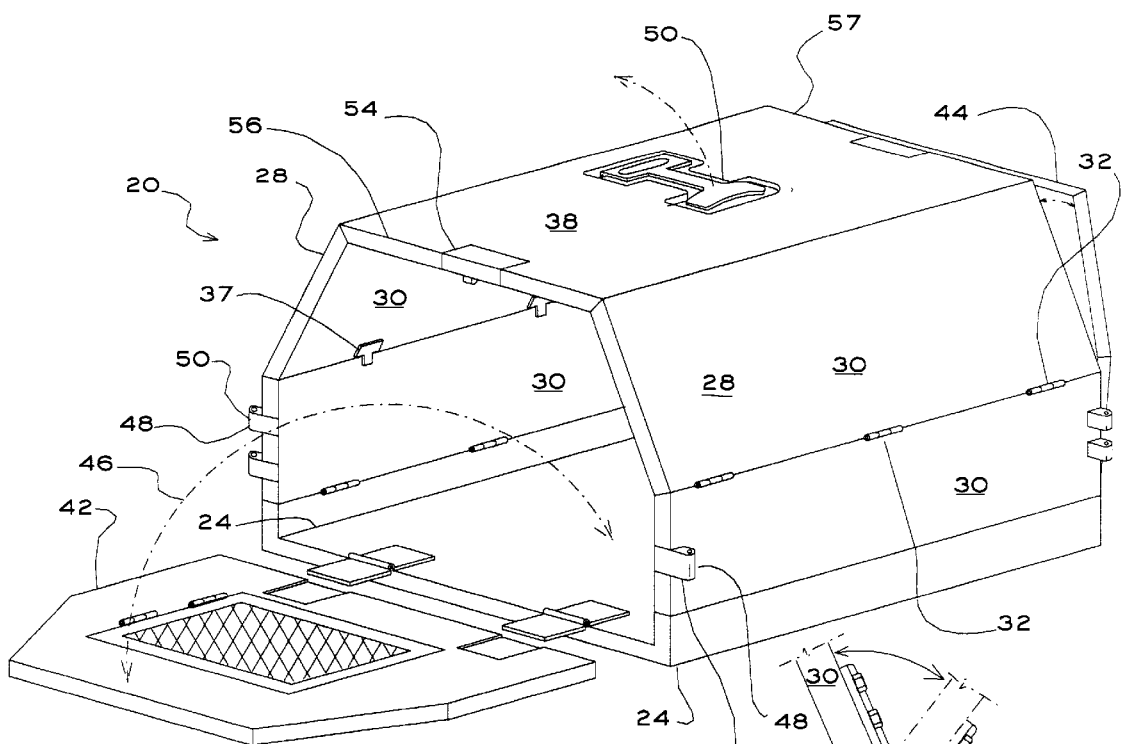
FIG. 1
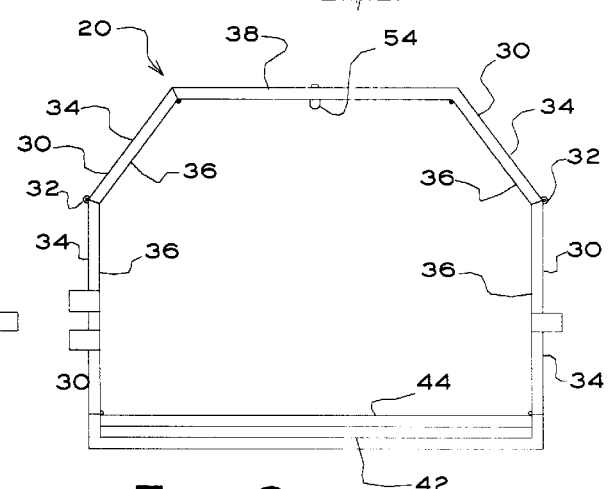
FIG. 3A
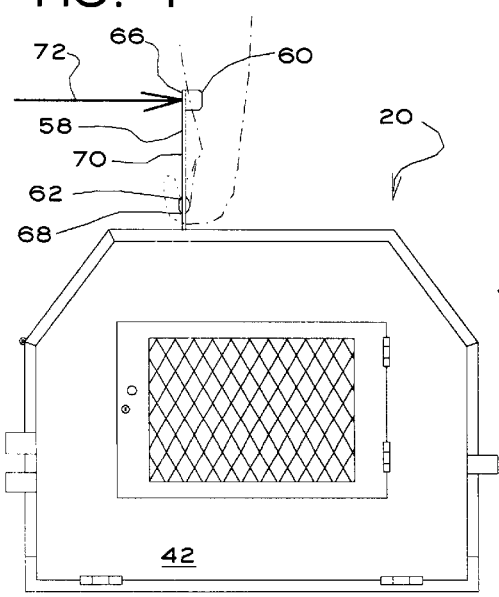
FIG. 2
FIG. 3

COLLAPSIBLE PET CARRIER

BACKGROUND OF THE INVENTION (a) Field of the Invention

This invention generally relates to a system for containing or caging animals. More particularly, but not by way of limitation, to a collapsible container for holding animals. The container being particularly useful for holding animals during transport.

(b) Known Art

The need to provide temporary housing for the storage or containment of animals has long been addressed by providing small cages or containers that hold the animal during transport or while housing the animal for a short time. A serious problem with these cages has been that they occupy the same amount of space when in use as well as when vacant. Therefore, artisans have provided collapsing carriers which occupy significantly less space when collapsed and not in use. Known devices, however, have left important problems relating to structural rigidity, structural efficiency, and ease of operation unsolved.

An example of known collapsible pet carriers is found in U.S. Pat. No. 5,492,818 to Wilson. The Wilson device includes a pair of vertical sidewalls that collapse and a hinged roof that collapses over the sidewalls, retaining the sidewalls between the floor and the roof when the device is in a collapsed position. A significant disadvantage of this arrangement is that the overall structure becomes highly unstable when the roof panes have been sized in order to ensure that the roof panels lie flat against the side panels when the device is in a collapsed configuration.

The instability results from the fact that in order to have a roof of substantially equal, hinged halves which lie flat over and against side panels that are also made from substantially equal halves, the resulting roof structure will be a structure that will tend to collapse due to a lack of support from the side panels.

Another known device is found in U.S. Pat. No. 4,484,540 to Yamamoto. The Yamamoto device includes inwardly collapsing walls, a top with four vertical sidewalls and a bottom with four vertical sidewalls. The ends and the collapsing walls nest within the vertical sidewalls of the top and bottom when the device is in a collapsed configuration. The Yamamoto device offers important advantages in applications where small pets are to be transported. Unfortunately, however, the Yamamoto device is disadvantaged in that the vertical sidewalls of the top and bottom limit the ratio of collapsibility of the device. Furthermore, the Yamamoto device is well suited for applications where small pets are to be transported, and which can be positioned under an airplane seat or similar location. This arrangement, however, is not particularly well suited for situations where many animals are to be transported, such as where several large dogs are to be transported in an aircraft.

Another device in which the top and bottom include vertical sidewalls is found in U.S. Pat. No. 4,800,842 to Jones Jr. The Jones Jr. device, while operating in a different manner than the Yamamoto device, suffers from substantially the same disadvantages as the Yamamoto device.

Thus, it will be appreciated that there remains a need for a collapsible pet carrier which provides a structurally efficient, rigid structure when expanded, and which provides advantages while transporting or housing several animals. Such and advantage could be gained by providing collapsible pet carriers that are stackable in a stable, orderly manner. Known collapsing pet houses or carriers such as the device shown in U.S. Pat. Nos. 4,109,427 and 4,085,762 to O'Brian et al., U.S. Pat. No. 4,295,446 to Voss, U.S Pat. No. 4,603,658 to Garnsey, and U.S. Pat. No. 3,324,831 to St. Onge include sloping roofs which do not allow convenient stacking of the devices.

Therefore, it will be understood that there remains a need for a collapsible pet carrier that can be stacked to allow transport of many pets.

There remains a need for a collapsing pet carrier that exhibits structural rigidity and structural efficiency, to allow stacking and unburdensome transport.

There remains a need for a collapsible pet carrier that can be stacked and provide access to the pets while the devices are stacked.

Still further, there remains a need for a collapsible pet carrier that is light and easy to carry.

There remains a need for a collapsible pet carrier that can be easily stacked and arranged next to one another such that the several carriers can be transported together with ease and stability.

SUMMARY

It has been discovered that the problems left unanswered by known art can be solved by a collapsible pet carrier which includes:

1) a floor panel having a pair of parallel sides and a pair of ends extending between the sides;
2) a pair of generally opposing walls hingedly attached to the parallel sides of the floor panel, each wall being collapsible towards the opposing wall, the hinged connection allowing movement of the wall panels from:
   a first position where the external surfaces of the wall panels are at an acute angle relative to one another to
   a second position where the external surfaces of the wall panels are retained at an angle greater than 180 degrees relative to one another;
3) a roof panel, the roof panel extending between the walls and being hingedly connected to the walls; and
   a pair of endwalls, each endwall being hingedly attached to the floor panel at opposing ends of the floor panel, the endwalls being adapted for supporting the wall panels in the second position, so that the roof panel is supported by the walls when the wall panels are at the second position.

In a highly preferred embodiment of the invention the collapsible pet carrier which includes:

1) a floor panel having a pair of parallel sides and a pair of ends extending between the sides;
2) a pair of generally opposing walls hingedly attached to the parallel sides of the floor panel, each wall being collapsible towards the opposing wall, the wall panels including a connector that allows attaching the wall of one pet carrier to the wall of another pet carrier, so that the two pet carriers joined together cooperate with one another to help support one another;
3) a roof panel, the roof panel extending between the walls and being hingedly connected to the walls; and
   a pair of endwalls, each endwall being hingedly attached to the floor panel at opposing ends of the floor panel, the endwalls being adapted for supporting the wall panels in the second position, so that the roof panel can be supported by the walls.

It has been discovered that the disclosed configuration provides important synergistic results in that by connecting a pair of collapsible pet carriers to one another takes advantage of the fact that the walls of the two adjacent containers will reinforce or support one another, producing a structure which is more stable than when the pet carriers are simply positioned next to one another.

The walls of a highly preferred embodiment of the invention the walls are formed from panels that cooperate with one another to provide a profile that is somewhat similar to a Mansard style roof configuration. In a highly preferred embodiment of the invention, the roof panel, which extends between the walls is hingedly connected to the walls such that it will remain a generally horizontal orientation, parallel to the floor panel, when the pet carrier is in a fully expanded configuration. This configuration will allow vertical stacking of the pet carriers. Accordingly, it will be understood that the stackable features and the interconnecting features will provide the user with a stable system that can be used to transport many animals in a vehicle such as an airplane, truck, and the like.

Additionally, it will be understood that the disclosed system will result in more efficient use of the cargo area of these vehicles. This is in large part due to the fact that the disclosed system allows the user to expand and connect only as many pet carriers as needed, while keeping additional carriers stored in a collapsed configuration.

Still further, it will be appreciated that the disclosed configuration of the wall panels will provide a particularly stable structure. An important factor contributing to the stability of the disclosed invention is the wall panels have been attached to one another such that the panels may fold from a first position where the external surfaces of the wall panels face one another to a second position where the external surfaces of the wall panels are retained at an angle greater than 180 degrees relative to one another.

The wall panels cooperate with one another in the second position by way of an abutment or stop at a distance from the hinge that holds the panels next to one another. It is further contemplated that the stability of the structure may be enhanced by the mounting of dogs or protrusions which provide an enlarged abutment area.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it should be clearly understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which:

FIG. 1 is a perspective view of a highly preferred embodiment of the disclosed pet carrier.

FIG. 2 is an end view of the embodiment illustrated on FIG. 1, the view also illustrating the use of an offset handle which abuts against the user's forearm to counteract the bending moment introduced by the support of the device from a location that at a distance from a line that extends though the center of gravity of the pet carrier.

FIG. 3 is an end view of the embodiment illustrated in FIG. 1, and showing the collapse of the end panels into the pet carrier, below the roof panel of the pet carrier.

FIG. 3A is a detailed view taken from FIG. 3, and illustrates the use of abutments to secure the wall panels at the desired position relative to one another.

DETAILED DESCRIPTION OF PREFERRED EXEMPLAR EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figure 8:
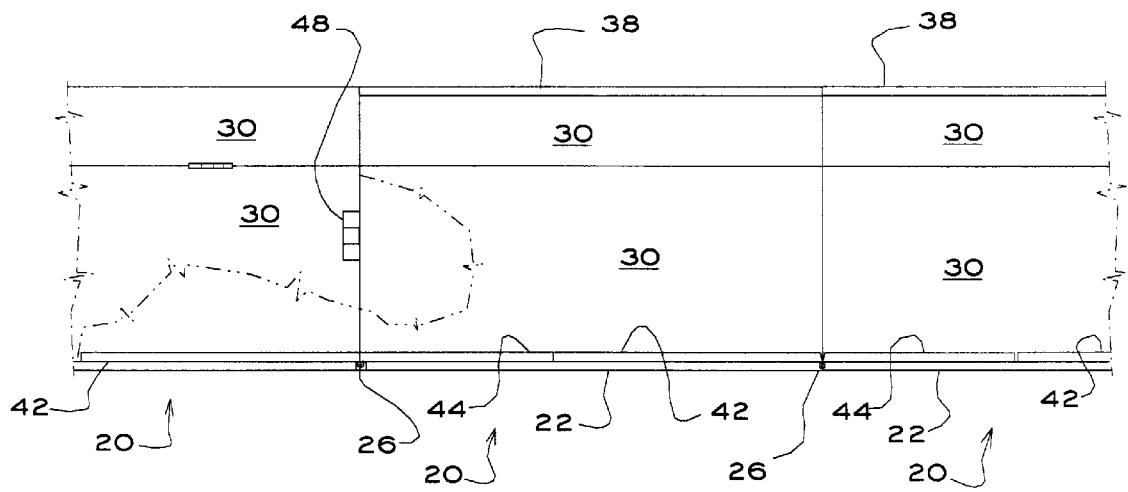
FIG. 8 illustrates the connection of several pet carriers in series.

Turning now to FIGS. 1, 2, and 8 where a collapsible pet housing structure 20 has been illustrated. From these figures it will be understood that the collapsible pet housing structure 20 includes a floor panel 22 which includes a pair of parallel sides 24 and a pair of ends 26 extending between the sides. Attached to the floor are a pair of generally opposing walls 28.

The walls 28 will preferably consist of a pair of generally planar wall panels 30 which are connected to one another by hinges 32 or by other connectors that allow pivoting of one wall panel 30 relative to the other wall panel 30. Preferably, the hinges 32 will be assisted by springs 29 that will urge the invention to its uncollapsed position. The walls 28 are pivotally or removably attached to the parallel sides 24 of the floor panel 22. It is important to note that in a highly preferred embodiment of the invention the sides 24 will rise above the floor panel 22. preferably, the sides 24 will extend above the floor panel to a distance which is approximately equal to the combined thickness of both of the endwalls 44 when both of the endwalls 44 are laid flat over one another.

Turning now to FIGS. 1–6 it will be understood that each of the wall panels 30 includes an external surface 34 and an internal surface 36. Additionally, it is preferred that the walls 28 will be mounted over the floor panel 22 such that the internal surface 36 of the wall panels 30 of one wall 28 faces the internal surface 36 of the wall panels 30 of the opposing wall 28. Thus, as illustrated, the pivoting hinged connection 33 between the wall panels 30 allows movement of the wall panels 30 from a first position, particularly illustrated in FIG. 6, where the external surfaces 34 of the wall panels 30 are at an acute angle relative to one another. It is important to note that what is referred to herein as an acute angle also includes when the external surfaces 34 contact one another.

FIGS. 1–3 illustrate that the wall panels 30 will pivot relative to one another to a second position where the external surfaces 34 of the wall panels 30 are retained at an angle greater than 180 degrees relative to one another. Referring to FIG. 3A, it will be understood that it is advantageous to incorporate means for retaining the external surfaces 34 of the all panels 30 at the second position relative to one another. In highly preferred embodiment of the invention these means include surfaces 38 which are at a distance from the hinges 32, towards the internal surface 36 of the wall panels 30, such that the pivoting of the wall panels 30 is limited a position where the external surfaces 34 are at an angle greater than 180 degrees relative to one another, and preferably less than 270 degrees relative to one another. FIG. 3A also illustrates that it is contemplated that dogs 37, which act stops or limiting catches further serve as means for cooperating with the wall panels to retain the external surfaces of the wall panels at the second position relative to one another.

Also shown on FIGS. 1–3 is that in a highly preferred embodiment of the invention a roof panel 38, which is hingedly connected to the walls 28, and extends between the walls 28. It is preferred that the hinged connection of the roof panel 38 to the walls 28 will be through one of the wall panels 30 in a manner that will result in the roof panel 38 extending horizontally across and over the floor panel 22.

As shown on FIG. 3A, it is contemplated that the relationship of the wall panels 30 may be established by providing mating surfaces 40 which limit the movement of the wall panels 30 relative to one another. Thus, as shown in FIG. 3A, the cooperation of the surfaces 40 and the hinges 32, or means for allowing pivoting, hinge-like movement, of the wall panels 30 to limit the movement of wall panels 30 when they reach the second position, shown on FIG. 1. Thus, it will be understood that, to add rigidity to the structure in the second position, it is contemplated that the dogs 37 may also be used to cooperate with the hinges 32 and the surfaces 40 to provide rigid cooperation of the wall panels 30 when they reach the second position.

Figure 7:
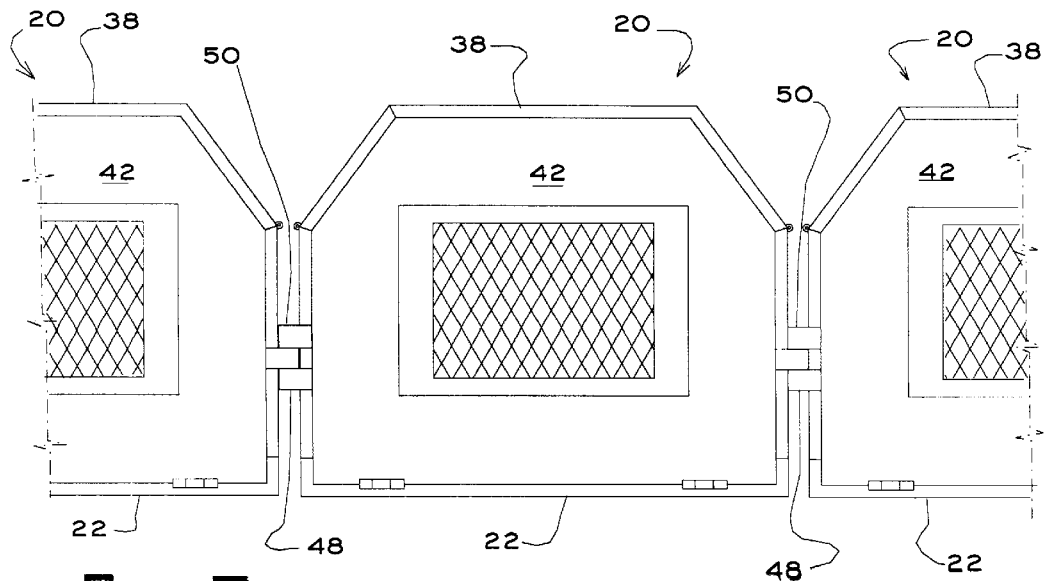
FIG. 7 illustrates the connection of several pet carriers in parallel.

Also shown on FIGS. 1, 7 and 8 is that to close off the structure and define an enclosed area for the animal, a pair of endwalls 42 and 44, each endwall 42 and 44 being hingedly attached to the floor panel 22 at opposing ends 26 of the floor panel 22. It is advantageous to configure the endwalls 42 and 44 such that they nest within the perimeter defined by the opposing walls 28, the roof panel 38, and the floor panel 22, such that the endwalls 42 and 44 cooperate with the opposing walls 28, the roof panel 38, and the floor panel 22 to support the structure in the second position, and further supporting the roof panel 38 in the second position.

Figure 9:
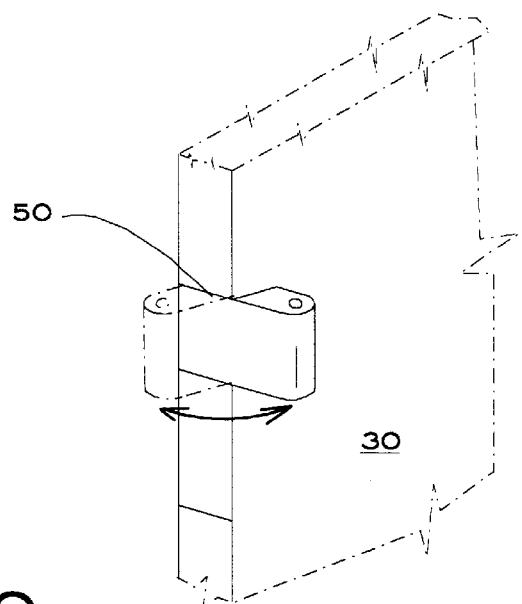
FIG. 9 illustrates the connection components used to form a highly preferred embodiment of the invention.

Referring once again to FIG. 1, it will be understood that it is contemplated that the endwalls 42 and 44 will be hingedly attached to the opposing ends 26 of the floor panel 22 such that the endwalls 42 and 44 will be pivotable approximately 180 degrees relative to the floor panel 22 as indicated by arrow 46. Referring to FIG. 8, it will be understood that this feature will allow the connection of the several housing structures 20 in series, to create a runner type kennel, for example. To ensure that the structures 20 remain at the desired orientation relative to one another, means 48 for attaching one of the structures 20 to another have been incorporated into the walls 28 of the structures 20. In a preferred embodiment of the invention, these means 48 consist of pivoting connectors 50 that can pivot from a position that allows connecting of the structures 20 in a parallel arrangement as shown on FIG. 7 or in series, as shown on FIG. 8. FIG. 9 further illustrates the direction of pivoting that is to be carried out by an embodiment of the connectors 50. It is contemplated that this connecting function may be carried out by fixed pivoting connectors as illustrated, or by means of flexible connectors.

It will be understood that the interconnecting feature of the disclosed invention provides important new and useful results in that the attachment of a structures 20 in a parallel fashion will allow the structures 20 to cooperate with one another to create an assembly that has improved rigidity characteristics over simply setting the structures next to one another.

Also illustrated in FIG. 1, is that it is contemplated that a trip latch 54 will be incorporated into the ends 56 and 57 of the roof panel 38. The trip latch 54 will allow securing of the endwalls 42 and 44 in an upright position, shown in FIG. 2, and allow the 180 degree motion illustrated in FIGS. 1 and 8.

Figure 4:
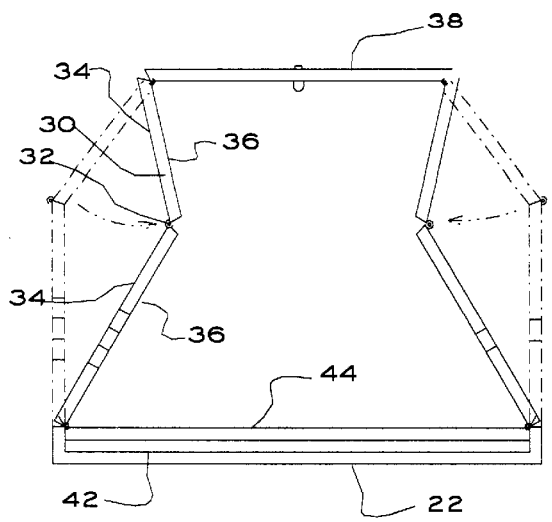
FIG. 4 is an end view of the pet carrier as the wall panels are collapsed towards one another.
Figure 5:
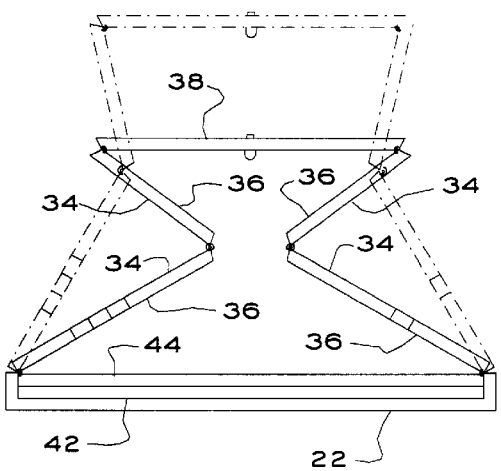
FIG. 5 is an end view taken from the same vantage point as FIG. 4 and further illustrating the sequence of events during the collapsing of the wall panels.
Figure 6:
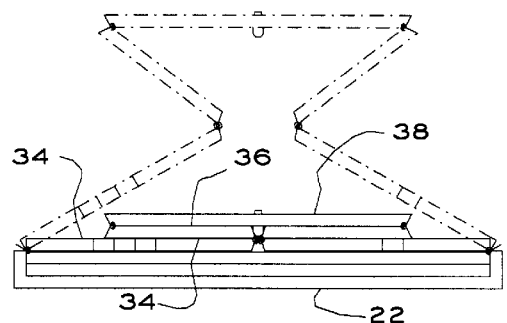
FIG. 6 is an end view taken from the same vantage point as FIG. 5 and further illustrating the sequence of events during the collapsing of the wall panels.

In operation, once the endwalls 42 and 44 have been laid down flat, generally parallel to the floor panel 22, the wall panels 30 may then be pushed away from the second position as indicated in FIG.4. This begins the folding operation, with the wall panels 30 folding further towards one another, as the roof panel 38 is lowered towards the floor panel 22 as shown on FIG. 5. The collapsing process is then completed when, as shown on FIG. 6, the wall panels 30 lie flat over the endwalls 42 and 44, with the roof panel 38 resting over these panels.

Referring now to FIGS. 1 and 2 it will be understood that a highly preferred embodiment of the invention will incorporate a collapsing roof handle 58 that provides a forearm support or rest 60 and a hand grip 62. The roof handle 58 will preferably include an elongated body 64 having a first end 66, a second end 68, and a mid-portion 70 between the first end 66 and the second end 68. The first end 66 is preferably pivotally attached to the roof panel 38, and the mid-portion includes the hand grip 62, which may be a simple elongated cutout portion adapted for accepting the user's hand. Additionally, the second end 68 will include the forearm rest 60, which will allow the user to carry the housing structure 20 in a generally horizontal orientation. The forearm rest 60 will provide a location where to react the forces 72 needed to overcome any rotational bias introduced by the attachment of the roof handle 58 at a location that is offset from the center of gravity of the housing structure 20. In particularly large embodiments of the housing structure 20 it may be necessary to mount a handle at an off-center location since it may be impracticable for a user to reach across the roof panel 38 and carry the housing structure 20 while holding his arm out to each the handle.

Thus it can be appreciated that the above described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. A collapsible pet housing structure comprising:
   a floor panel having a pair of parallel sides and a pair of ends extending between the sides;
   a pair of generally opposing walls hingedly attached to the parallel sides of said floor panel, each wall comprising at least two generally planar wall panels connected to one another by a hinge connection, each of the wall panels having an external surface and an internal surface, the internal surface of the wall panels of one wall facing the internal surface of the wall panels of the opposing wall, the hinged connection between the wall panels allowing the wall panels to cooperate with one another to retain the external surfaces of the wall panels at an angle greater than 180 degrees relative to one another, so that the hinged connection allows movement of the wall panels from:

a first position where the external surfaces of the wall panels are at an acute angle relative to one another to a second position where the external surfaces of the wall panels are retained at an angle greater than 180 degrees relative to one another, the walls having means for retaining the external surfaces of the wall panels at the second position relative to one another;

a roof panel, the roof panel being of a weight and extending between the walls and being hingedly connected to said walls; and a pair of endwalls, each endwall being hingedly attached to said floor panel at opposing ends of the floor panel, so that the roof panel is supported by said walls when said wall panels are at the second position, and so that the roof panel cooperates with the wall panels such that the weight of the roof panel assists in maintaining the wall panels in the second position.

2. A collapsible pet housing structure according to claim 1 wherein at least one of said endwalls is hingedly attached to said floor panel by means of a hinge that permits approximately 180 degrees of motion of the endwall, from a position directly over and a against the floor panel to a position were the end panel extends away from the floor panel while being approximately parallel to the floor panel.

3. A collapsible pet housing structure according to claim 2 and further comprising a trip latch on the roof panel over the hinge attaching the endwall to the floor panel.

4. A collapsible pet housing structure according to claim 1 and further comprising means for attaching one said pet housing structure to another pet housing structure.

5. A collapsible pet housing structure according to claim 1 and further comprising a roof handle having an elongated body having a first end, a second end, and a mid-portion between the first end and the second end, the first end being pivotally attached to the roof panel, a hand grip near the first end, and the second end having a forearm rest.

6. A collapsible pet housing structure according to claim 1 wherein said endwalls are hingedly attached to said floor panel by means of a hinge that permits approximately 180 degrees of motion of the endwall, from a position directly over and a against the floor panel to a position were the end panel extends away from the floor panel while being approximately parallel to the floor panel.

7. A collapsible pet housing structure comprising:

a floor panel having a pair of parallel sides and a pair of ends extending between the sides;

a pair of generally opposing walls hingedly attached to the parallel sides of the floor panel, each of the walls comprising at least two generally planar wall panels hingedly connected to one another along a hinge line, each of the wall panels having an external surface and an internal surface, the internal surface of the wall panels of one wall facing the internal surface of the wall panels of the opposing wall, the hinged connection between the wall panels allowing the wall panels to cooperate with one another to retain the external surfaces of the wall panels at an angle greater than 180 degrees relative to one another, so that the hinged connection allows movement of the wall panels from:

a first position, where the external surfaces of the wall panels are at an acute angle relative to one another to a second position where the external surfaces of the wall panels are retained at an angle greater than 180 degrees relative to one another by a means for cooperating with the wall panels to retain the external surfaces of the wall panels at the second position relative to one another; and a roof panel, the roof panel being of a weight and extending between the walls and being hingedly connected to said walls, so that the roof panel is supported by said walls when said wall panels are at the second position relative to one another, and so that the roof panel cooperates with the wall panels such that the weight of the roof panel assists in maintaining the wall panels in the second position.

8. A collapsible pet housing structure according to claim 7 wherein at least one of said endwalls is hingedly attached to said floor panel by means of a hinge that permits approximately 180 degrees of motion of the endwall, from a position directly over and a against the floor panel to a position were the end panel extends away from the floor panel while being approximately parallel to the floor panel.

9. A collapsible pet housing structure according to claim 8 and further comprising a trip latch on the roof panel over the hinge attaching the endwall to the floor panel.

10. A collapsible pet housing structure according to claim 7 and further comprising means for attaching one said pet housing structure to another pet housing structure.

11. A collapsible pet housing structure according to claim 7 and further comprising a roof handle having an elongated body having a first end, a second end, and a mid-portion between the first end and the second end, the first end being pivotally attached to the roof panel, the mid-portion having a hand grip, and the second end having a forearm rest.

12. A collapsible pet housing structure comprising:

a floor panel having a pair of parallel sides and a pair of ends extending between the sides;

a pair of walls hingedly connected to the floor panel and comprising at least two generally planar wall panels hingedly connected to one another along a hinge line, each of the wall panels having an external surface, the hinged connection between the wall panels allowing the wall panels to cooperate with one another to retain the external surfaces of the wall panels at an angle greater than 180 degrees relative to one another, so that the hinged connection provides movement of the wall panels from:

a first position where the external surfaces of the wall panels are at an acute angle relative to one another to a second position where the external surfaces of the wall panels are retained at an angle greater than 180 degrees relative to one another, the walls having means for retaining the external surfaces of the wall panels at the second position relative to one another; and a flat roof panel, the roof panel being of a weight and extending between the walls and being hingedly connected to said walls, so that the roof panel is supported by said walls when said wall panels are at the second position relative to one another, and so that the roof panel cooperates with the wall panels such that the weight of the roof panel assists in maintaining the wall panels in the second position.

13. A collapsible pet housing structure according to claim 12 wherein at least one of said endwalls is hingedly attached to said floor panel by means of a hinge that permits approximately 180 degrees of motion of the endwall, from a position directly over and a against the floor panel to a position were the end panel extends away from the floor panel while being approximately parallel to the floor panel.

14. A collapsible pet housing structure according to claim 13 and further comprising a trip latch on the roof panel over the hinge attaching the endwall to the floor panel.

15. A collapsible pet housing structure according to claim 12 and further comprising means for attaching one said pet housing structure to another pet housing structure.

16. A collapsible pet housing structure according to claim 12 and further comprising a roof handle having an elongated body having a first end, a second end, and a mid-portion between the first end and the second end, the first end being pivotally attached to the roof panel, the mid-portion having a hand grip, and the second end having a forearm rest.

17. A collapsible pet carrier according to claim 12 wherein the hinged connection of said wall panels includes means for biasing said wall panels towards said second position.

* * * * *